US009830946B2

(12) United States Patent
Mate et al.

(10) Patent No.: US 9,830,946 B2
(45) Date of Patent: Nov. 28, 2017

(54) SOURCE DATA ADAPTATION AND RENDERING

(71) Applicant: Nokia Technologies Oy, Espoo (FI)

(72) Inventors: Sujeet Shyamsundar Mate, Tampere (FI); Igor Danilo Diego Curcio, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/964,505

(22) Filed: Dec. 9, 2015

(65) Prior Publication Data

US 2016/0191885 A1 Jun. 30, 2016

(30) Foreign Application Priority Data

Dec. 30, 2014 (GB) .................................. 1423325.8

(51) Int. Cl.
*H04N 5/77* (2006.01)
*G11B 27/00* (2006.01)

(52) U.S. Cl.
CPC ............. *G11B 27/00* (2013.01); *H04N 5/772* (2013.01)

(58) Field of Classification Search
None
See application file for complete search history.

(56) References Cited

U.S. PATENT DOCUMENTS

| 8,347,210 B2 | 1/2013 | Ubillos et al. | |
| 2007/0124783 A1* | 5/2007 | Ahiska | H04N 5/23206 |
| | | | 725/105 |
| 2012/0198319 A1* | 8/2012 | Agnoli | G06F 9/4843 |
| | | | 715/202 |
| 2013/0290818 A1 | 10/2013 | Arrasvuori et al. | |
| 2014/0368734 A1* | 12/2014 | Hoffert | H04N 5/44591 |
| | | | 348/564 |
| 2015/0078723 A1 | 3/2015 | Curcio et al. | |

FOREIGN PATENT DOCUMENTS

| GB | 2418091 A | 3/2006 |
| GB | 2526805 A | 12/2015 |

OTHER PUBLICATIONS

Chang et al., "Real-Time Content-Based Adaptive Streaming of Sports Videos", IEEE Workshop on Content-Based Access of Image and Video Libraries, Jul. 2001, pp. 1-8.
"Video Indexing, Summarization, and Adaptation", Digital Video and Multimedia Lab, Nov. 4, 2002, pp. 1-48.

(Continued)

*Primary Examiner* — Eileen Adams
(74) *Attorney, Agent, or Firm* — Alston & Bird LLP

(57) ABSTRACT

The invention relates to a method for source data adaptation and rendering. The method comprises receiving source data; processing the source data to determine rendering parameters; wherein the processing comprises obtaining processing-free temporal segments either by applying wide angles at periodic intervals to the source data or rendering a predetermined region of the source data; determining content characteristics of a visual frame; and utilizing content characteristics for controlling the obtained processing-free temporal segments; signaling the rendering parameters for playback; and adapting the rendering parameters to render the processing-free temporal segments from the source content.

20 Claims, 11 Drawing Sheets

(56) References Cited

OTHER PUBLICATIONS

Ciubotaru et al., "Objective Assessment of Region of Interest-Aware Adaptive Multimedia Streaming Quality", IEEE Transactions on Broadcasting, vol. 55, No. 2, May 5, 2009, pp. 1-11.

Mavlankar et al., "Pre-Fetching Based on Video Analysis for Interactive Region-Of-Interest Streaming of Soccer Sequences", 16th IEEE International Conference on Image Processing, Nov. 7-10, 2009, 4 pages.

Foote et al., "Creating Music Videos Using Automatic Media Analysis", Proceedings of the tenth ACM international conference on Multimedia, Dec. 1-6, 2002, pp. 553-560.

U.S. Appl. No. 14/728,901, "Methods, Apparatuses and Computer Programs for Adapting Content", filed Jun. 2, 2015, 38 pages.

Search Report received for corresponding United Kingdom Patent Application No. 1423325.8, dated Jun. 29, 2015, 4 pages.

\* cited by examiner

SOURCE DATA ADAPTATION AND RENDERING

TECHNICAL FIELD

The present embodiments relate generally to content adaptation in real-time playback.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Today's smart phones and other mobile devices, such as tablet devices, have different functionalities with respect of imaging, video recording, image and video processing and viewing. When a video has been recorded with 4K (4 000 pixels) resolution, the video can be viewed without any transformation on a 4K display. When viewing the same 4K video on a device with—for example—VGA (Video Graphics Array) display, the content needs to be resized to fit the display.

SUMMARY

Now there has been invented an improved method and technical equipment implementing the method, for content adaptation in real-time playback. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method comprising receiving source data; processing the source data to determine rendering parameters; wherein the processing comprises obtaining processing-free temporal segments either by applying wide angles at periodic intervals to the source data or rendering a predetermined region of the source data; determining content characteristics of a visual frame; and utilizing content characteristics for controlling the obtained processing-free temporal segments; signaling the rendering parameters for playback; and adapting the rendering parameters to render the processing-free temporal segments from the source content.

According to a second aspect, there is provided an apparatus comprising at least one processor, memory including computer program code, the memory and the computer program code configured to, with the at least one processor, cause the apparatus to perform at least the following: receive source data; process the source data to determine rendering parameters; wherein the processing comprises to obtain processing-free temporal segments either by applying wide angles at periodic intervals to the source data or rendering a predetermined region of the source data; to determine content characteristics of a visual frame; and to utilize content characteristics for controlling the obtained processing-free temporal segments; signal the rendering parameters for playback; and adapt the rendering parameters to render the processing-free temporal segments from the source content.

According to a third aspect, there is provided a computer program product embodied on a non-transitory computer readable medium, comprising computer program code configured to, when executed on at least one processor, cause an apparatus or a system to: receive source data; process the source data to determine rendering parameters; wherein the processing comprises to obtain processing-free temporal segments either by applying wide angles at periodic intervals to the source data or rendering a predetermined region of the source data; to determine content characteristics of a visual frame; and to utilize content characteristics for controlling the obtained processing-free temporal segments; signal the rendering parameters for playback; and adapt the rendering parameters to render the processing-free temporal segments from the source content.

According to a fourth aspect, there is provided an apparatus comprising: means for receiving source data; means for processing the source data to determine rendering parameters; wherein the processing comprises means for obtaining processing-free temporal segments either by applying wide angles at periodic intervals to the source data or rendering a predetermined region of the source data; means for determining content characteristics of a visual frame; and means for utilizing content characteristics for controlling the obtained processing-free temporal segments; means for signaling the rendering parameters for playback; and means for adapting the rendering parameters to render the processing-free temporal segments from the source content.

According to a fifth aspect, there is provided a computer program embodied on a non-transitory computer readable medium, the computer program comprising instructions causing, when executed on at least one processor, at least one apparatus to: receive source data; process the source data to determine rendering parameters; wherein the processing comprises obtaining processing-free temporal segments either by applying wide angles at periodic intervals to the source data or rendering a predetermined region of the source data; determining content characteristics of a visual frame; and utilizing content characteristics for controlling the obtained processing-free temporal segments; signal the rendering parameters for playback; and adapt the rendering parameters to render the processing-free temporal segments from the source content.

According to an embodiment, the content characteristics relate to audio content characteristics relation to one of the following group: a beat, a downbeat, a speech, a phrase, silence.

According to an embodiment, the controlling of the processing-free temporal segments comprises affecting either the number of wide angles in the source data or duration of the wide angles in the source data.

According to an embodiment, the method further comprises streaming a source data to a playback device.

According to an embodiment, the method further comprises signalling the rendering parameters with the source data to the playback device.

According to an embodiment the source data is live video data.

According to an embodiment, the source data is received from a server or a video recorder.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of live content adaptation for rendering on various devices. The devices may have different display resolution than the recording device.

The present embodiments do not require a live encoder, only the playback on devices needs to be adaptive to take into account the content characteristics. The content characteristics are utilized for performing real-time analysis. In addition, the present embodiments take into account the delays in audio and video highlight detection while The present embodiments do not erode viewing experience by stop/start of video modality or reduce the received bitrate.

Figure 2:
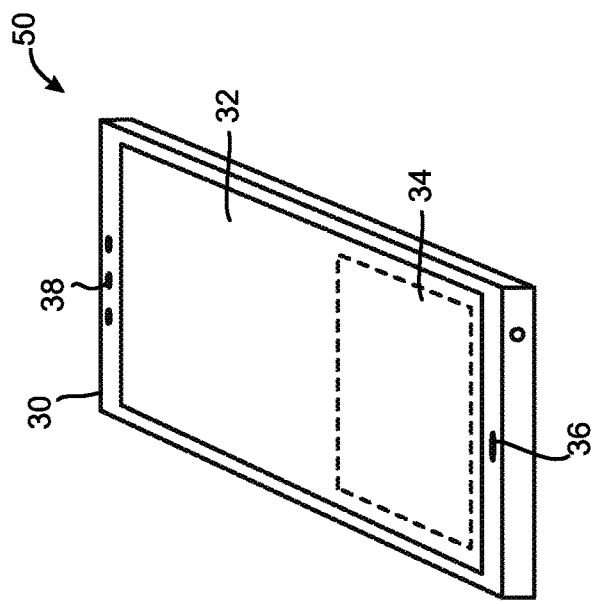
FIG. 2 shows a layout of an apparatus according to an embodiment.
Figure 1:
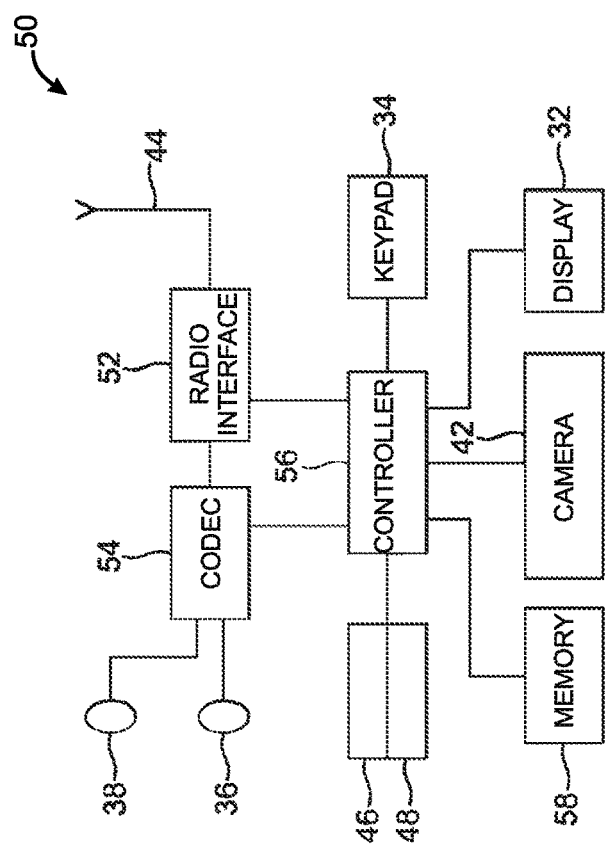
FIG. 1 shows a simplified block chart of an apparatus according to an embodiment.

FIGS. 1 and 2 illustrate an apparatus according to an embodiment. The apparatus 50 is an electronic device for example a mobile terminal or a user equipment of a wireless communication system or a camera device. The embodiments disclosed in this application can be implemented within any electronic device or apparatus which is able to capture digital images, such as still images and/or video images, and is connectable to a network. The apparatus 50 may comprise a housing 30 for incorporating and protecting the device. The apparatus 50 further may comprise a display 32, for example, a liquid crystal display or any other display technology capable of displaying images and/or videos. The apparatus 50 may further comprise a keypad 34. According to another embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which may be any of the following: an earpiece 38, a speaker or an analogue audio or digital audio output connection. The apparatus 50 may also comprise a battery (according to another embodiment, the device may be powered by any suitable mobile energy device, such as solar cell, fuel cell or clockwork generator). The apparatus may comprise a camera 42 capable of recording or capturing images and/or video, or may be connected to one. According to an embodiment, the apparatus 50 may further comprise an infrared port for short range line of sight communication to other devices. According to an embodiment, the apparatus 50 may further comprise any suitable short range communication solution such as for example a Bluetooth wireless connection or a USB/firewire wired solution.

The apparatus 50 may comprise a controller 56 or processor for controlling the apparatus. The controller 56 may be connected to memory 58 which, according to an embodiment, may store both data in the form of image and audio data and/or may also store instructions for implementation on the controller 56. The controller 56 may further be connected to codec circuitry 54 suitable for carrying out coding and decoding or audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

According to an embodiment, the apparatus 50 comprises a camera 42 capable of recording or detecting still images or individual image frames which are then passed to the codec 54 or controller for processing. According to an embodiment, the apparatus may receive the still or video image data for processing from another device prior to transmission and/or storage. According to an embodiment, the apparatus 50 may receive the images for processing either wirelessly or by a wired connection.

Figure 3:
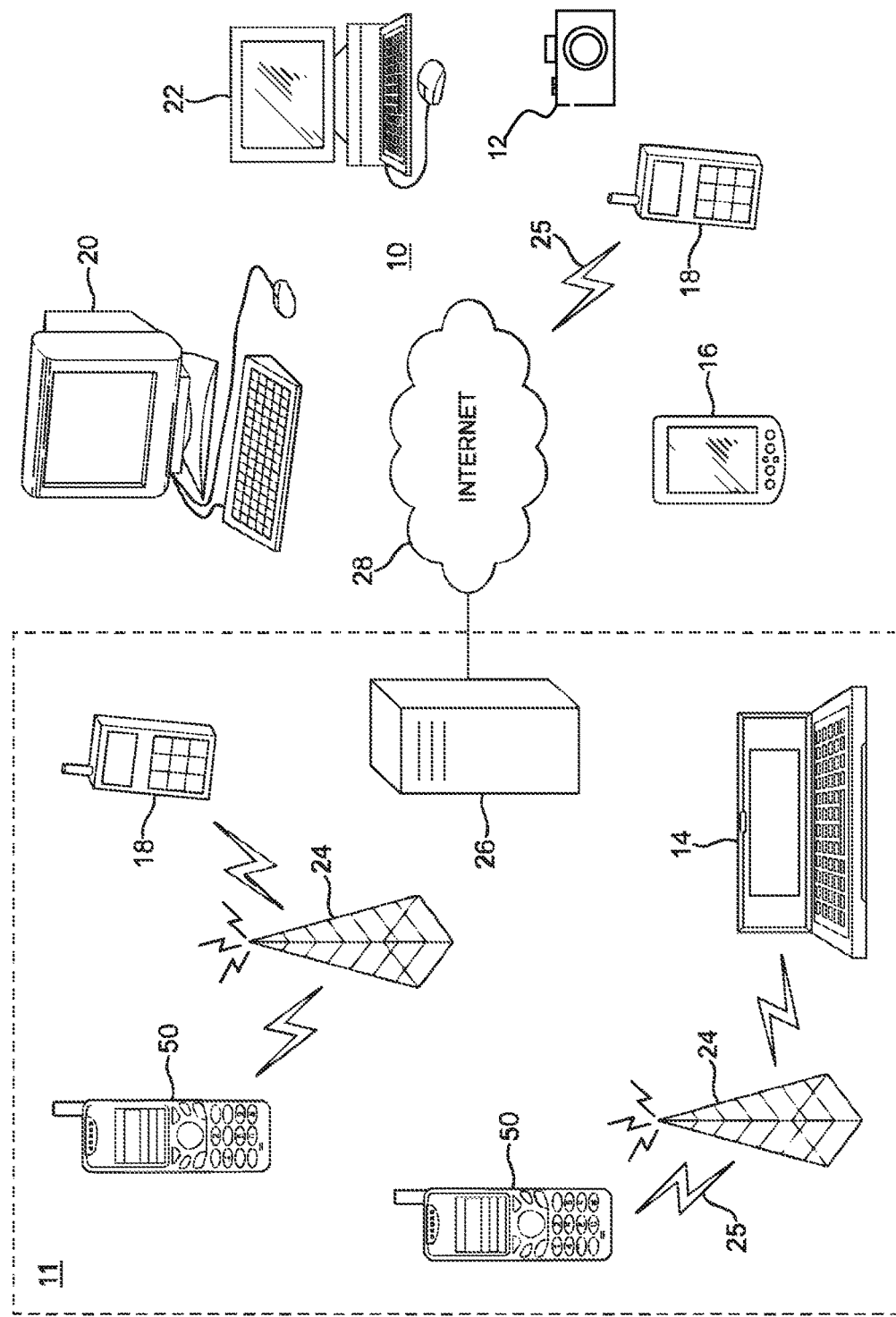
FIG. 3 shows a system configuration according to an embodiment.

FIG. 3 shows a system configuration comprising a plurality of apparatuses, networks and network elements according to an embodiment. The system 10 comprises multiple communication devices which can communicate through one or more networks. The system 10 may comprise any combination of wired or wireless networks including, but not limited to a wireless cellular telephone network (such as a GSM, UMTS, CDMA network, etc.), a wireless local area network (WLAN), such as defined by any of the IEEE 802.x standards, a Bluetooth personal area network, an Ethernet local area network, a token ring local area network, a wide area network, and the internet.

The system 10 may include both wired and wireless communication devices or apparatus 50 suitable for implementing present embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a digital camera 12. The apparatus 50 may be stationary or mobile when carried by an individual who is moving. The apparatus 50 may also be located in a mode of transport.

Some of further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telephone system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communication device involved in implementing various embodiments of the present invention may communicate using various media including, but not limited to, radio infrared, laser, cable connections or any suitable connection.

The present embodiments relate to generating a content rendering for consumption/viewing in heterogeneous devices in delay and resources constrained scenario.

The present embodiments use the following methods to generate avenues for content processing without introducing additional delays in the form of pre-roll buffers. The methods being utilized are 1) Cinematic rules for content rendering and 2) Content characteristics derived by analyzing the content.

Figure 4:
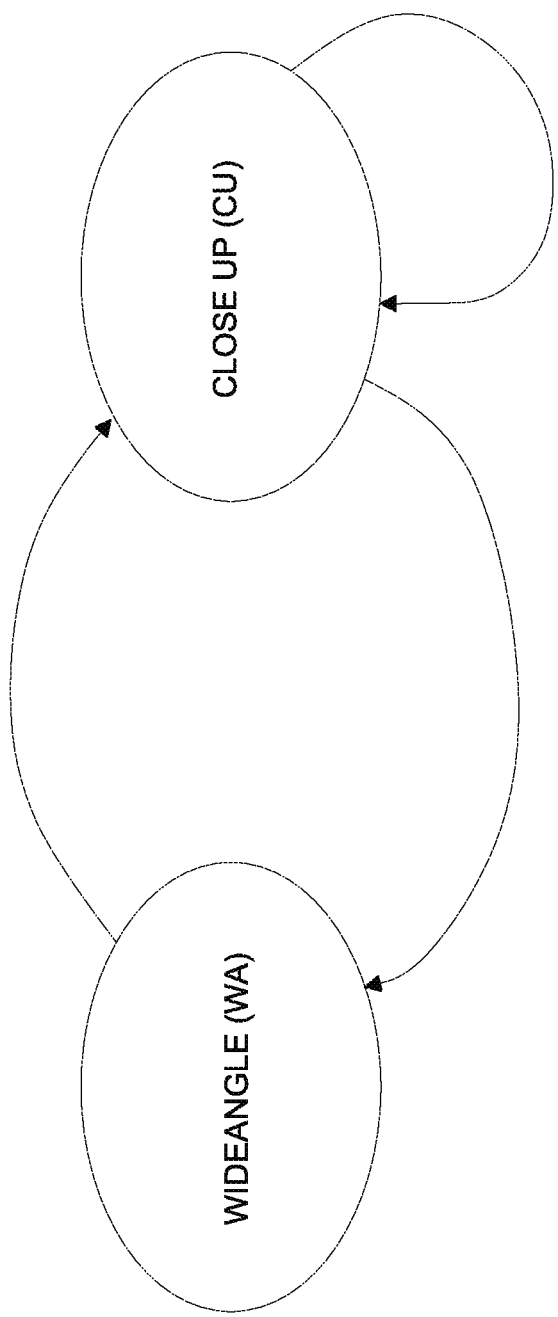
FIG. 4 shows a state diagram of sequences of shot types using cinematic rules.

"Cinematic rules" refer to widely used thumb rules about shot types and shot sequences. For example, a wide angle (WA) shot is usually followed by a close-up (CU) shot. A CU is usually followed by another CU or WA. This has been illustrated in FIG. 4. As an example, the shot sequences may consist of WA→CU→WA→CU; WA→CU→CU→WA; etc. Wide angle (WA) has usually temporally longer duration than a CU.

The cinematic rules may be utilized to mask delays in content processing. In order to perform appropriate rendering region selection for higher resolution rendering, the characteristic and/or semantics of the visual frame are determined. The determination of the appropriate rendering region expects processing of the high resolution visual frames. The processing time may depend on the available computing resources. If the computing resources are insufficient to determine the characteristics and/or semantics information of a temporal segment of the video before its intended rendering, additional time needs to be made available for completing the analysis.

Figure 5:
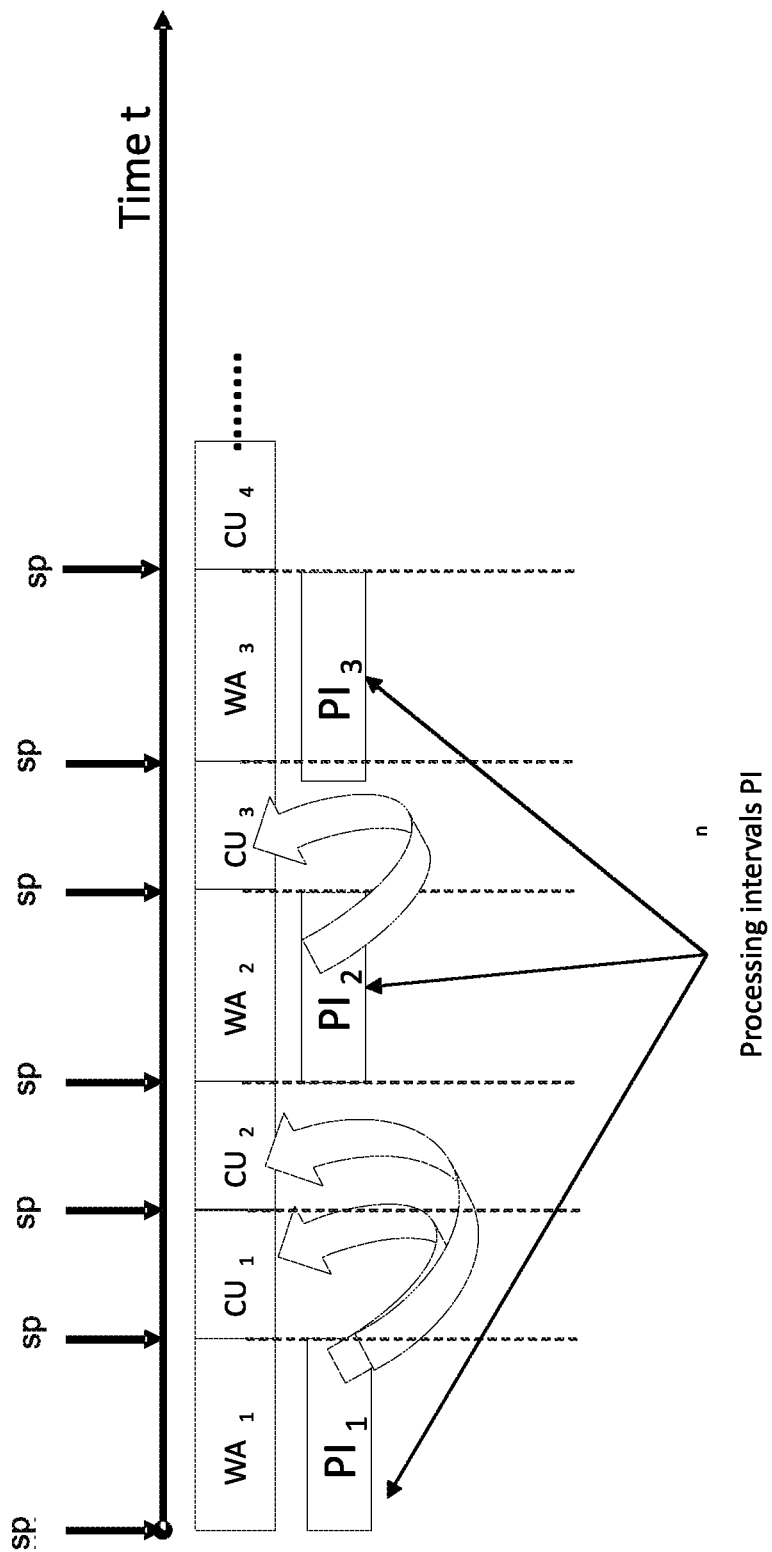
FIG. 5 shows a wide angle analysis free segments as temporal buffer for processing.

The present embodiments propose utilizing leveraging the cinematic rules of remixing wide angles at periodic intervals to a source data to create situational awareness of the event. During wide angle rendering, the whole visual frame without any region of interest specific rendering can be done. The temporal segment of video can be rendered without any processing of the visual characteristics or semantics, thus such temporal segment is called "processing-free temporal segment". A first level of resource adaptation is achieved by using this processing-free temporal segment rendering. FIG. 5 illustrates wide angle analysis as temporal buffer for processing. The first level of resource adaptation is used to perform processing for the subsequent close up temporal segments, the processing (PI$_1$) for CU$_1$ and CU$_2$ is initiated during WA$_1$. To provide additional temporal buffer for processing initiated during a close up temporal segment for the subsequent close up temporal segment(s), the processing for CU$_4$ is initiated during CU$_3$, but WA$_3$ period is used as temporal buffer. In FIG. 5, switch point (sp) from wide angle (WA) to close up (CU) are derived based on media characteristics/semantics, such as audio characteristics, being described next.

Figure 6:
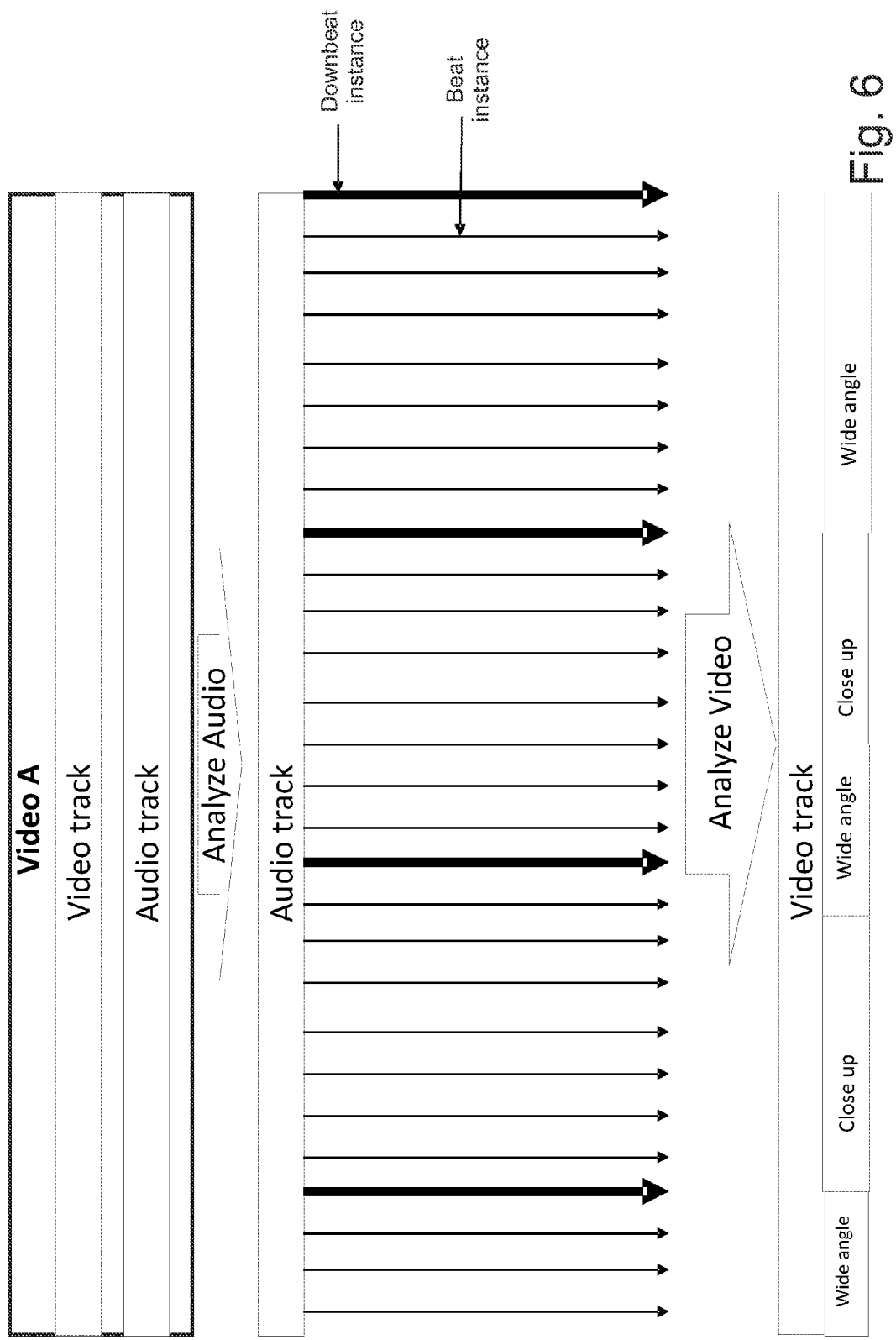
FIG. 6 shows processing delay adaptation using audio characteristics/semantics.

The media characteristics and/or semantics are used to tune the processing free temporal segments. The second level of resource adaptation is achieved by utilizing the content characteristics (e.g. audio content characteristics) for controlling the obtained processing-free temporal segments, e.g. by increasing the number of wide angles of the duration of wide angles with minimal reduction on the aesthetic value of the viewing experience. This is achieved by utilizing the audio content semantics/characteristics. Processing audio is less complex relative to visual modality, see FIG. 6 showing processing delay adaptation using audio characteristics/semantics. The audio information can be used to optimize/reduce the visual content processing. The wide angles are introduced based on audio characteristics at different layers of granularity.

Figure 7:
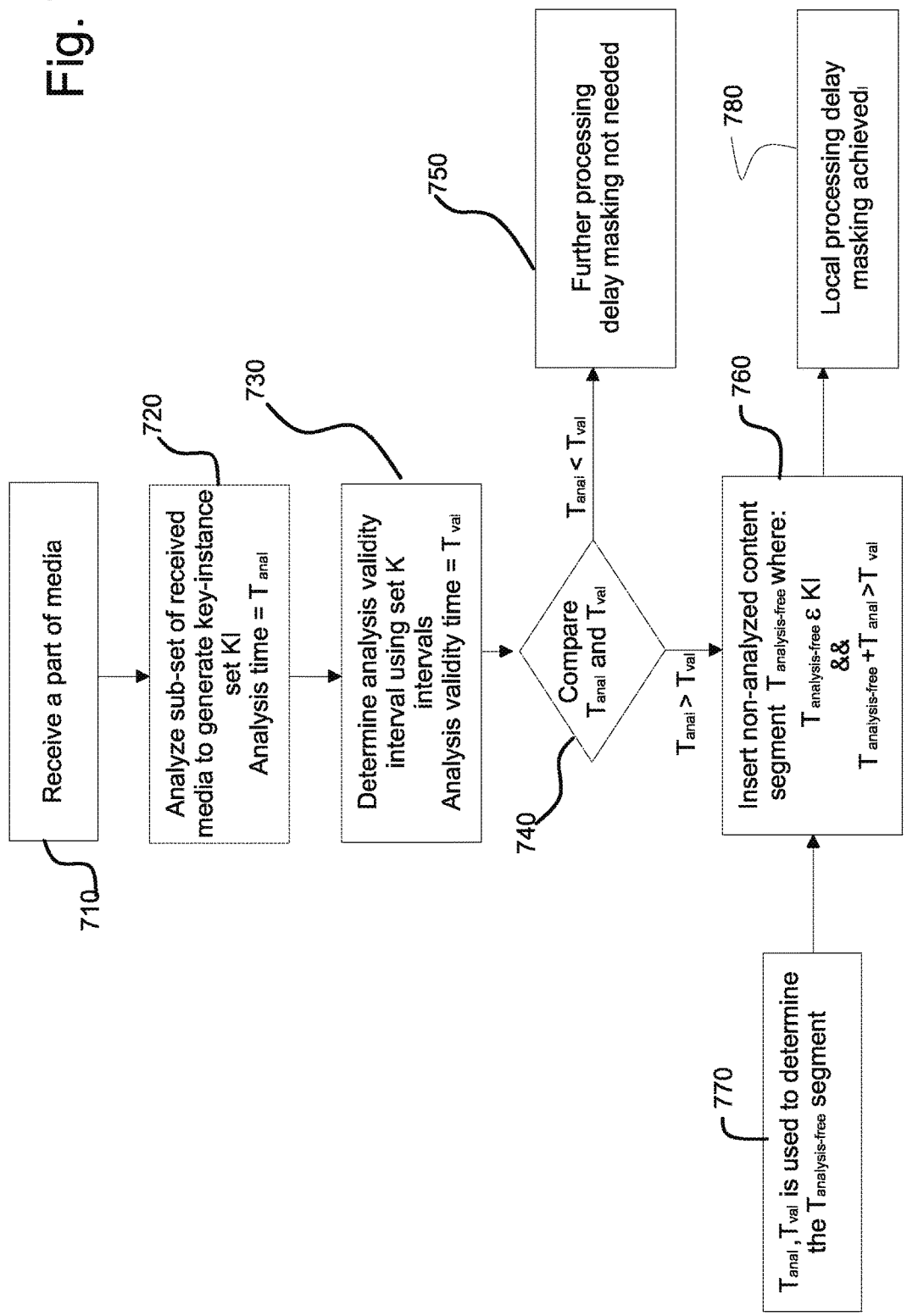
FIG. 7 shows a predictive local processing adaptation.

FIG. 7 illustrates a predictive local processing adaptation. At first a part of media is received 710. A sub-set of the received media is analyzed 720 to generate key-instance set KI, where KI refers to beats/downbeats/speech segments etc. Analysis time is referred as T$_{anal}$. Analysis validity interval is determined 730 using set KI intervals. Analysis validity time is referred as T$_{val}$. The analysis time and analysis validity time are compared 740. If T$_{anal}$ is smaller than T$_{val}$, then further processing delay masking is not needed 750. If T$_{anal}$ is greater than T$_{val}$, then non-analyzed content segment T$_{analysis-free}$ is inserted 760, where T$_{analysis-free}$ refers to wide angle segments, and where analysis free interval T$_{analysis-free}$ are from the key instance KI candidate temporal instances. T$_{anal}$ and T$_{val}$ are used 770 to determine the T$_{analysis-free}$ segment. This can be achieved by summing T$_{analysis-free}$ with T$_{anal}$ which should be greater than T$_{val}$. After this, the local processing delay masking is achieved 780.

Instead of analyzing close-up region of interest at every beat, the analysis may be performed at down beat. In addition, the wide angle durations can be increased by one or more beat intervals to maintain coherency with the content characteristics while increasing the available temporal threshold with fine grained intervals. According to an embodiment, instead of the beat/downbeat information, speech/phrase/silence or such other suitable parameters may be used for incorporating processing free temporal segments in conjunction with cinematic rules to minimize degradation in aesthetic value while achieving the latency targets for given local playback computing resource.

Figure 8:
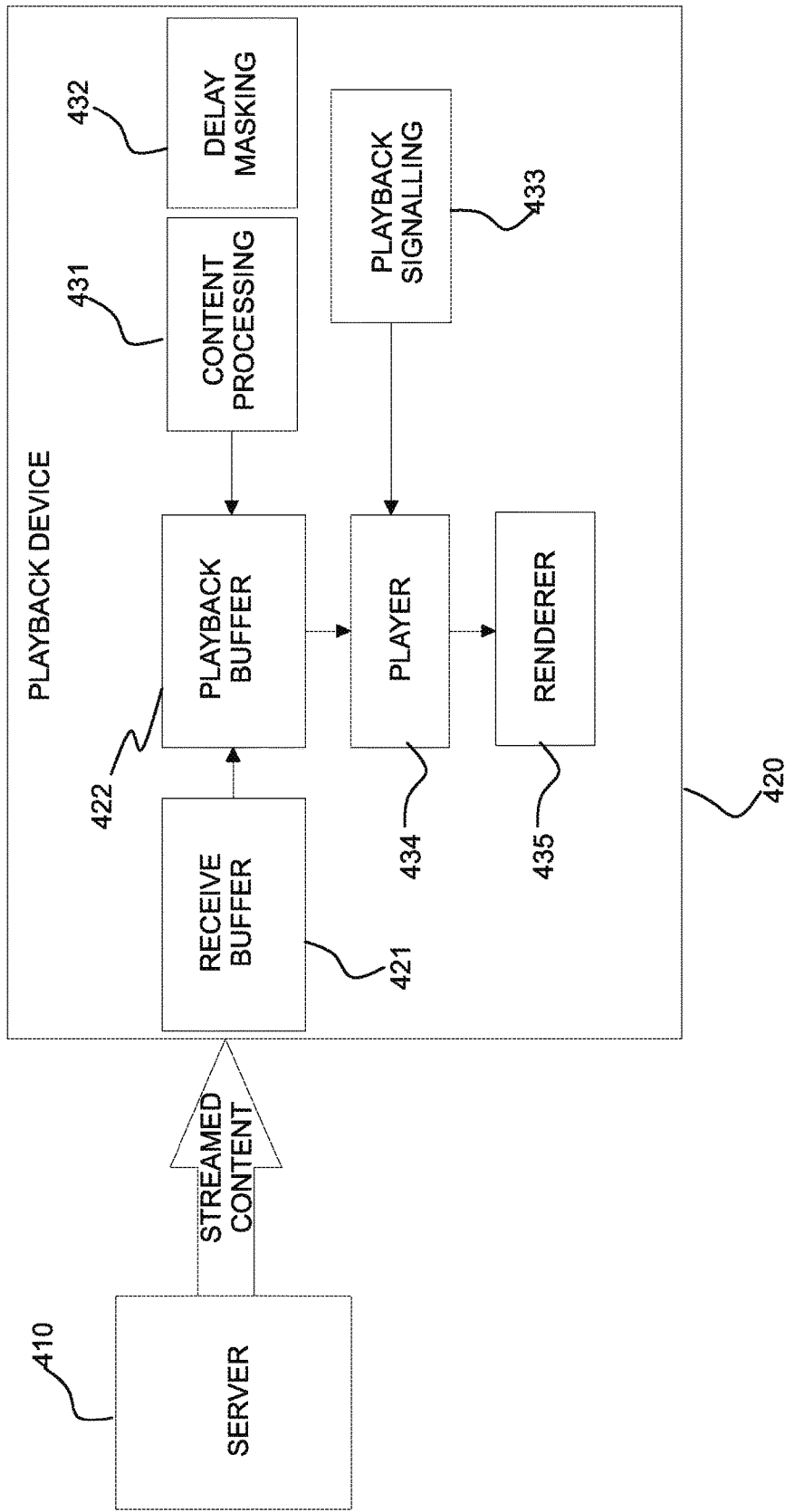
FIG. 8 shows a system for live content adaptation according to an embodiment.

FIG. 8 illustrates a system according to an embodiment. A server 410 is configured to stream video content to a playback device 420. The streaming may be performed by using any suitable transport protocol, for example HTTP (Hypertext Transform Protocol), RTSP (Real Time Streaming Protocol) or RTP (Real-time Transport Protocol), etc. The server streamed source content (later "source content") is received by a receive buffer 421. The receive buffer 421 is configured to make the source content available in such a way that it is usable for further processing. For example, if the streaming is implemented with multiplexing or encryption or error coding, the inversion operations to get back the required content is performed in the receive buffer 421. A playback buffer 422 has the source content in the right order which is suitable for chronological playback. The source content from the playback buffer 422 is processed in a content processing module 431 to determine the media characteristics and rendering parameters. For example, which regions in the source content need to be zoomed in or emphasized for rendering. The audio and video analysis is performed using the content processing module 431. The content processing module 431 is configured to signal the necessary information (i.e. the rendering parameters) to a player module 434 via the playback buffer 422. The rendering parameters have been obtained by using the technique described above, with reference to FIGS. 5-7, i.e. the technique on how real-time latency bounds are achieved. The logic for introducing processing free temporal segments in order to mask the higher latency in resources constrained playback device is residing in the content processing 431, delay masking 432 and playback signalling module 433.

The playback of source content is performed based on the rendering parameters received by the player module 434 from the content processing module 431. The player module 434 depending on the content rendering signals the rendering parameters to the renderer 435 to adapt the rendering parameters to finally render the desired spatio-temporal segment from the source content.

Figure 9:
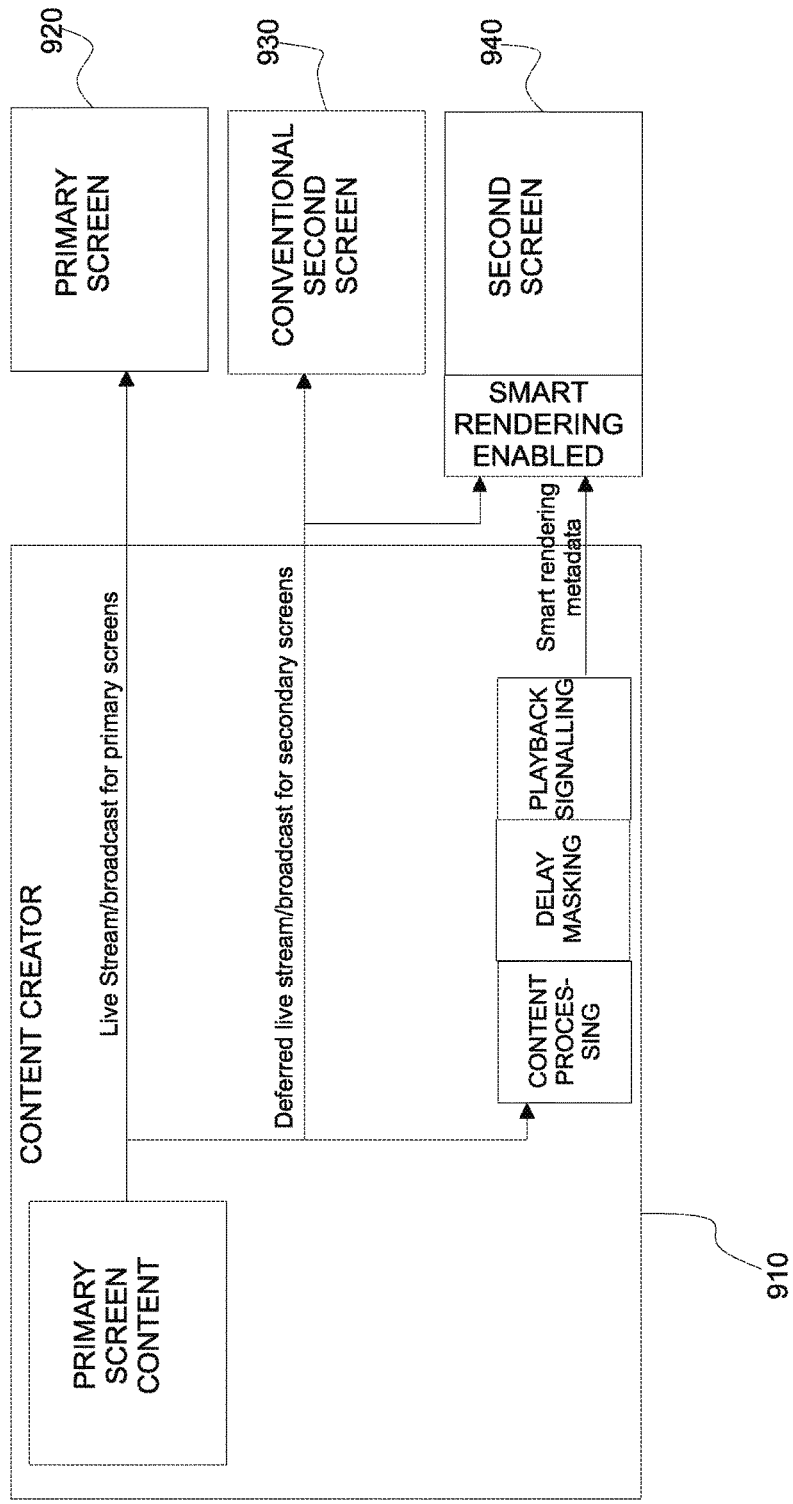
FIG. 9 shows a system for live content adaptation according to another embodiment.

According to an embodiment, shown in FIG. 9, the content processing module and playback signalling module reside on the server, and the rendering parameters are signaled to the playback device together with the streamed source content. The signalling may be out-of-band or in-band depending on the implementation requirements. FIG. 9 illustrates that a content creator 910 role is given to an entity which is broadcasting/streaming the content to the desired audience. The entity can be any entity. The content creator 910 can be a broadcaster. The receiving device can be a primary screen 920 such as a conventional television which consume the primary or default broadcast content. The receiving device can be another type of a device, so called a conventional second screen 930, such as a mobile phone, a tablet, etc. The third type of device are second screen devices 940 which are equipped with smart rendering capability. The embodiment illustrated in FIG. 8 can be applied to the content creator based content adaptation setup as shown in FIG. 9.

Figure 10:
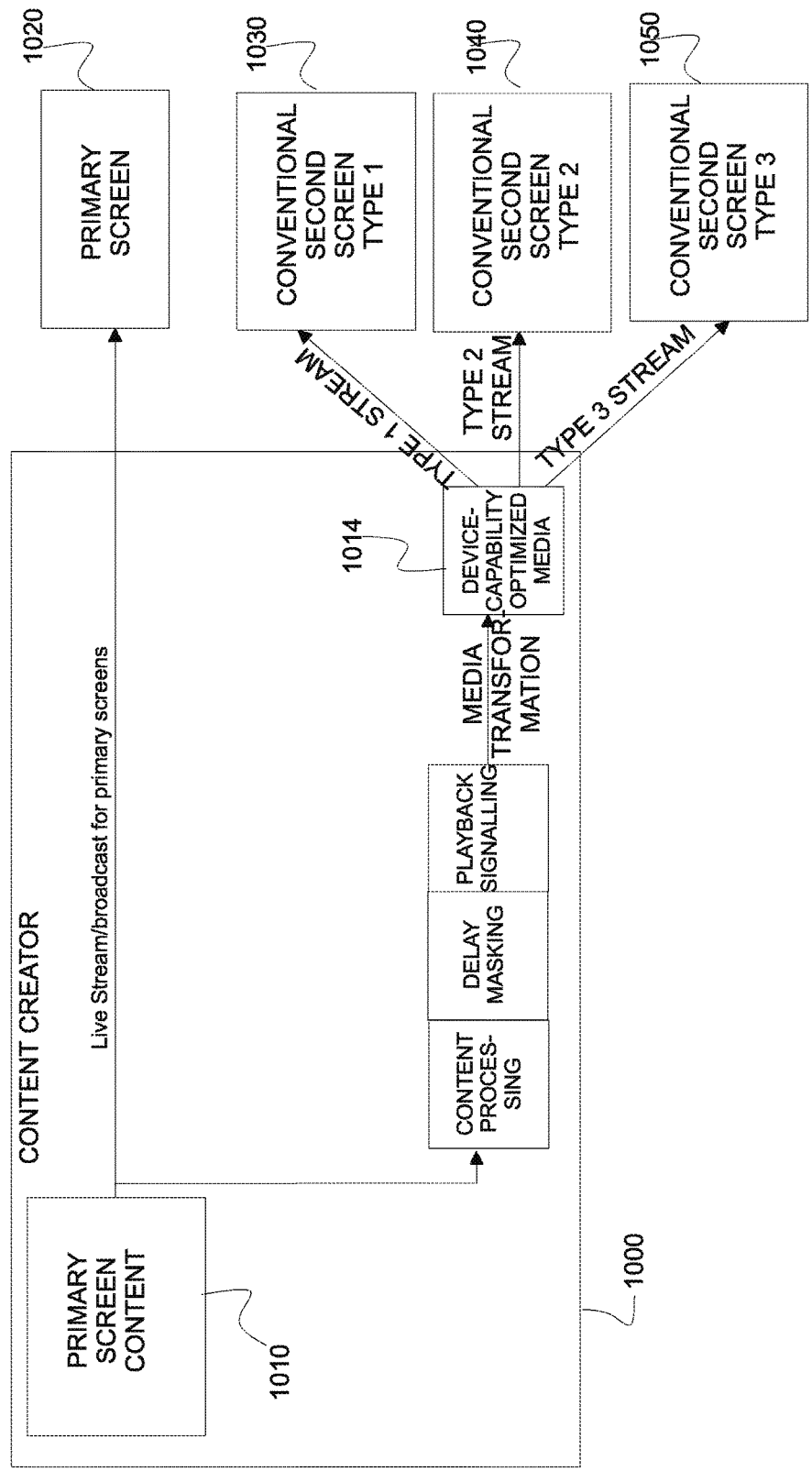
FIG. 10 shows a system for live content adaptation according to yet another embodiment.

According to another embodiment, shown in FIG. 10, the content transformation for optimal rendering on second screen devices is done before transmission at module 1014. In the embodiment of FIG. 10, the second screen devices 1030, 1040, 1050 need not to have any additional software, but the stream is optimized for each device separately (i.e. type 1 stream; type 2 stream; type 3 stream).

The content transformation for optimal rendering for second screen devices may consist of extracting an important spatio-temporal region of interest and thus avoiding excessive reduction in relative size of objects of interest while rendering a very high resolution stream on a low resolution second screen device.

Figure 11:
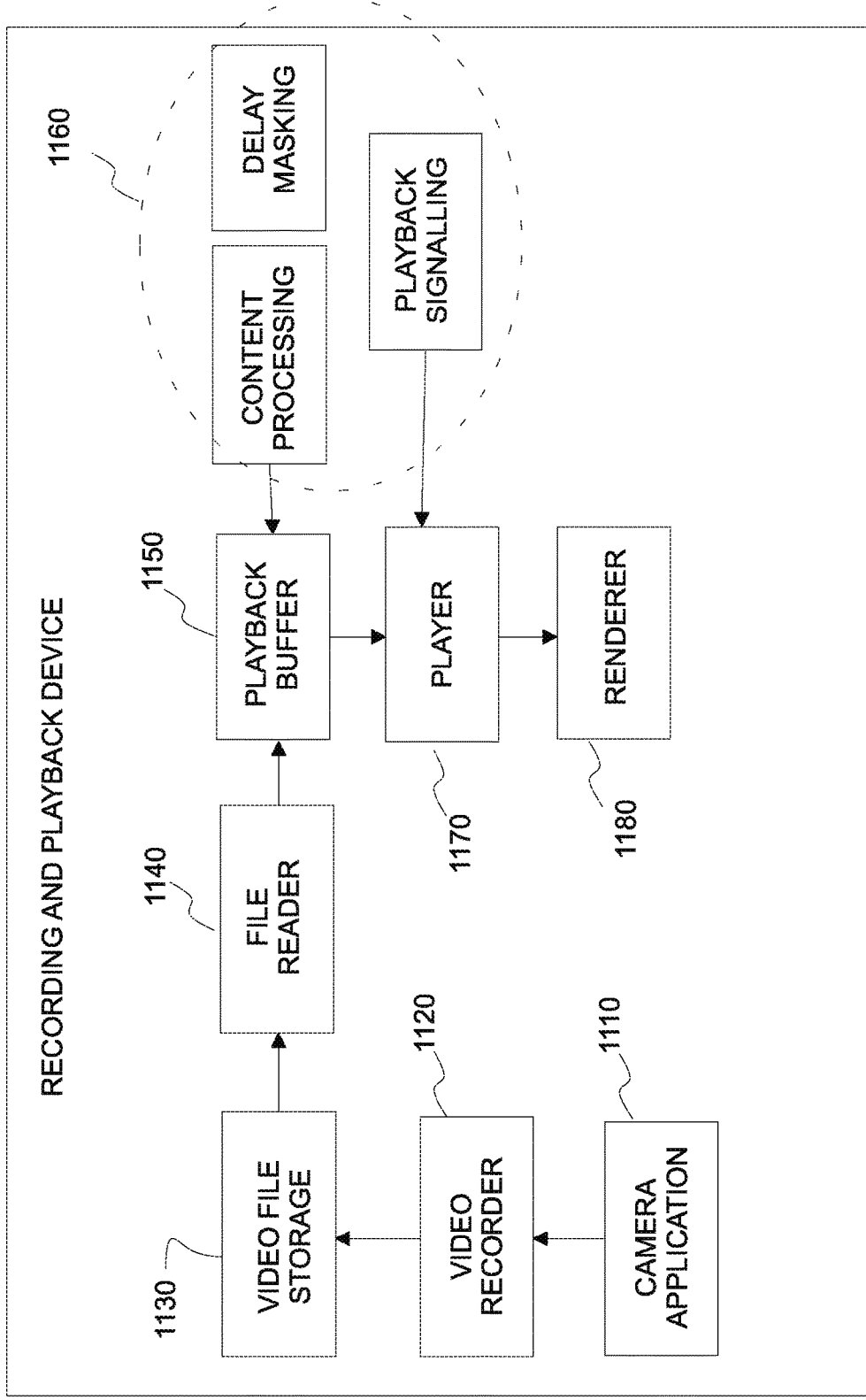
FIG. 11 shows a system for live content adaptation according to yet another embodiment; and'

In yet another embodiment, the present solution may be implemented for local processing of the content. FIG. 11 illustrates such embodiment. The use case which is significant for all mobile devices as well as cameras, consists of recording content with the native camera. Subsequently, generating a smart video rendering while viewing the content, consequently this needs to be done in real-time to avoid any details to the user and provide an "instant gratification" user experience. FIG. 11 illustrates a recording and playback device comprising a camera application 1110 and a video recorder 1120 for capturing video data to be stored in a video file storage 1130. A file reader 1140 reads the video file and provides it to a playback buffer 1150. The source content from the playback buffer 1150 is processed in a content processing module 1160 to determine the media characteristics. For example, which regions in the source content need to be zoomed in or emphasized for rendering. The audio and video analysis is performed using the content processing module 1160. The content processing module 1160 is configured to signal the necessary information to a player module 1170.

The playback of source content is performed based on the signal received by the player module 1170 from the content processing module 1160. The player module 1170 transmits the received signals (i.e. the rendering parameters) to the renderer 1180 to adapt the rendering parameters to finally render the desired spatio-temporal segment from the source content.

Figure 12:
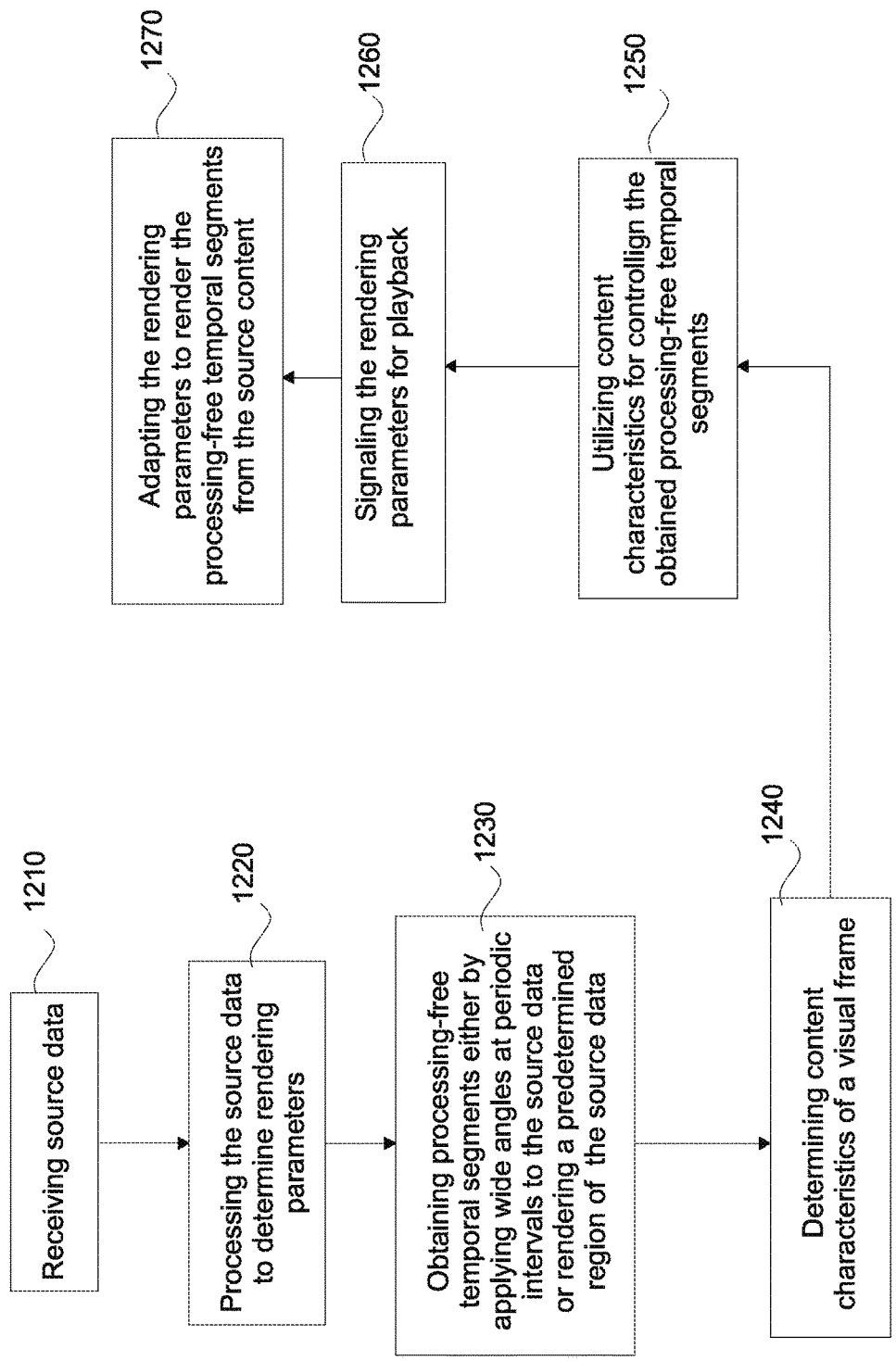
FIG. 12 is a flowchart illustrating a method according to an embodiment.

An embodiment of a method is illustrated as a flowchart in FIG. 12. The method comprises receiving 1210 source data; processing 1220 the source data to determine rendering parameters; wherein the processing comprises obtaining 1230 processing-free temporal segments either by applying wide angles at periodic intervals to the source data or rendering a predetermined region of the source data; determining 1240 content characteristics of a visual frame; and utilizing 1250 content characteristics for controlling the obtained processing-free temporal segments; signaling 1260 rendering parameters for playback; and adapting 1270 the rendering parameters to render the processing-free temporal segments from the source content.

The apparatus implementing the method comprises means for processing, memory means including computer program code, means for receiving source data; means for processing the source data to determine rendering parameters; means for obtaining processing-free temporal segments either by applying wide angles at periodic intervals to the source data or rendering a predetermined region of the source data; means for determining content characteristics of a visual frame; and means for utilizing content characteristics for controlling the obtained processing-free temporal segments; means for signaling the rendering parameters for playback; and means for adapting the rendering parameters to render the processing-free temporal segments from the source content.

The various embodiments may provide advantages. The present embodiments provide real-time second screen content derived from primary broadcast content. The present embodiments provide an ability to utilize devices with different computing resources. The adaptation is graceful in order to cover maximum number of devices with minimal reduction in aesthetic quality of the viewing experiences. The present embodiments further provide improved user experiences without additional encoder or server side complexity.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method comprising:
   receiving source data;
   processing the source data to determine rendering parameters; wherein the processing comprises:
      obtaining processing-free temporal segments by applying wide angles at periodic intervals to the source data based on media characteristics and semantics of the source data;
      determining content characteristics of a visual frame; and
      utilizing content characteristics for controlling the obtained processing-free temporal segments by affecting duration of the wide angles in the source data;
   signaling the rendering parameters for playback; and
   adapting the rendering parameters to render the processing-free temporal segments from the source content.

2. The method according to claim 1, wherein content characteristics relate to audio content characteristics associated with one of the following group: a beat, a downbeat, a speech, a phrase, and silence.

3. The method according to claim 1, wherein the controlling of the processing-free temporal segments comprises affecting the number of wide angles in the source data.

4. The method according to claim 1, further comprising streaming the source data to a playback device.

5. The method according to claim 4, further comprising signaling the rendering parameters with the source data to the playback device.

6. The method according to claim 1, wherein the source data is live video data.

7. The method according to claim 1, wherein the source data is received from a server or a video recorder.

8. An apparatus comprising at least one processor, and a non-transitory memory including computer program code, wherein the memory including the computer program code is configured to, with the at least one processor, cause the apparatus to perform at least the following:
   receive source data;
   process the source data to determine rendering parameters; wherein the processing comprises:
      obtaining processing-free temporal segments by applying wide angles at periodic intervals to the source data based on media characteristics and semantics of the source data;
      determining content characteristics of a visual frame; and
      utilizing content characteristics for controlling the obtained processing-free temporal segments by affecting duration of the wide angles in the source data;
   signal the rendering parameters for playback; and
   adapt the rendering parameters to render the processing-free temporal segments from the source content.

9. The apparatus according to claim 8, wherein content characteristics relate to audio content characteristics associated with one of the following group:
   a beat, a downbeat, a speech, a phrase, and silence.

10. The apparatus according to claim 8, wherein the controlling of the processing-free temporal segments comprises affecting the number of wide angles in the source data.

11. The apparatus according to claim 8, further comprising streaming the source data to a playback device.

12. The apparatus according to claim 11, further comprising signaling the rendering parameters with the source data to the playback device.

13. The apparatus according to claim 8, wherein the source data is live video data.

14. The apparatus according to claim 8, wherein the source data is received from a server or a video recorder.

15. A computer program product embodied on a non-transitory computer readable medium, comprising computer program code configured to, when executed on at least one processor, cause an apparatus or a system to:
   receive source data;
   process the source data to determine rendering parameters; wherein the processing comprises:
      obtaining processing-free temporal segments by applying wide angles at periodic intervals to the source data based on media characteristics and semantics of the source data;
      determining content characteristics of a visual frame; and
      utilizing content characteristics for controlling the obtained processing-free temporal segments by affecting duration of the wide angles in the source data;
   signal the rendering parameters for playback; and
   adapt the rendering parameters to render the processing-free temporal segments from the source content.

16. The computer program product according to claim 15, wherein content characteristics relate to audio content characteristics associated with one of the following group: a beat, a downbeat, a speech, a phrase, and silence.

17. The computer program product according to claim 15, wherein the controlling of the processing-free temporal segments comprises affecting the number of wide angles in the source data.

18. An apparatus comprising:
   at least one processor and at least one memory including a computer program code, wherein the at least one memory and the computer program code are configured, with the at least one processor, to cause the apparatus at least to:
      process the source data to determine rendering parameters;
   wherein the processing comprises
      obtain processing-free temporal segments by applying wide angles at periodic intervals to the source data based on media characteristics and semantics of the source data;
      determine content characteristics of a visual frame; and
      utilize content characteristics for controlling the obtained processing-free temporal segments by affecting duration of the wide angles in the source data;
      and
      adapt the rendering parameters to render the processing-free temporal segments from the source content.

19. The apparatus according to claim 18, wherein content characteristics relate to audio content characteristics associated with one of the following group: a beat, a downbeat, a speech, a phrase, and silence.

20. A computer program embodied on a non-transitory computer readable medium, the computer program comprising instructions causing, when executed on at least one processor, at least one apparatus to:
   receive source data;
   process the source data to determine rendering parameters; wherein the processing comprises:

obtaining processing-free temporal segments by applying wide angles at periodic intervals to the source data based on media characteristics and semantics of the source data;

determining content characteristics of a visual frame; and utilizing content characteristics for controlling the obtained processing-free temporal segments by affecting duration of the wide angles in the source data;

signal the rendering parameters for playback; and adapt the rendering parameters to render the processing-free temporal segments from the source content.

* * * * *